(No Model.) 2 Sheets—Sheet 1.

W. BIDDLE.
ELECTRIC CAR LIGHTING APPARATUS.

No. 550,242. Patented Nov. 26, 1895.

WITNESSES:
Frank L. Ober
Chas. H. Smith

INVENTOR
William Biddle
BY
Lemuel W. Serrell
ATTORNEY (No Model.) 2 Sheets—Sheet 2.
W. BIDDLE.
ELECTRIC CAR LIGHTING APPARATUS.
No. 550,242. Patented Nov. 26, 1895.
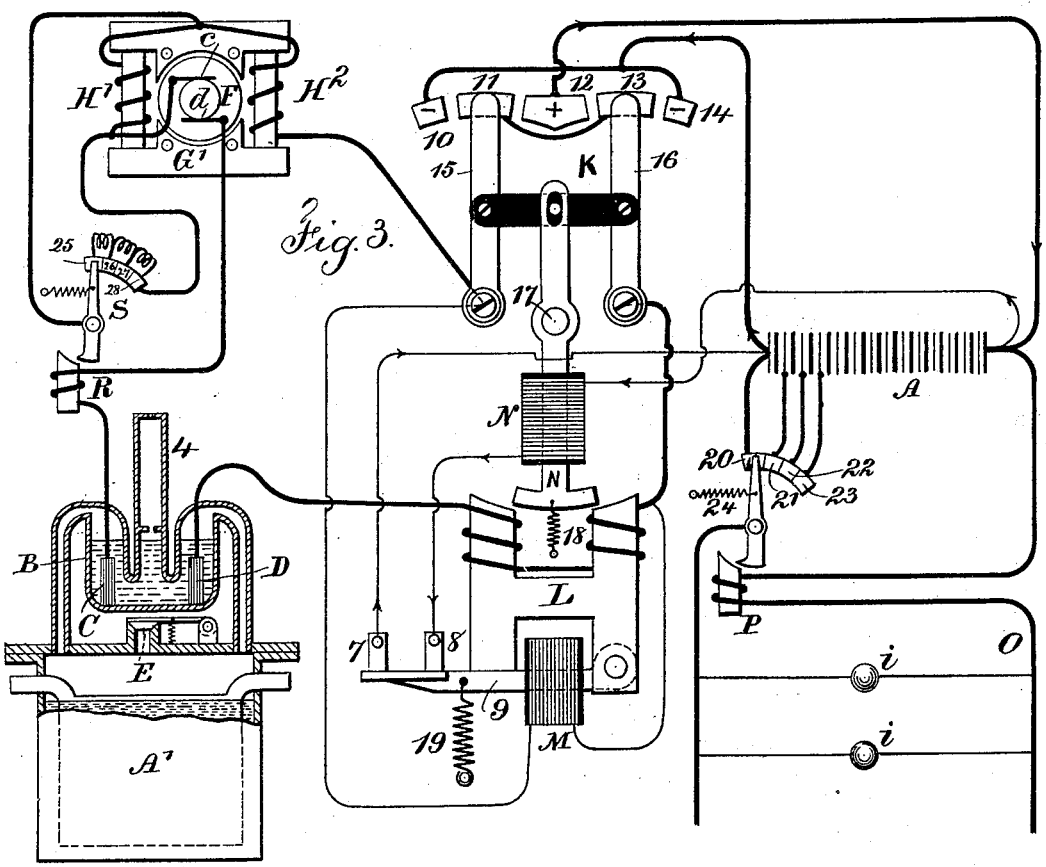
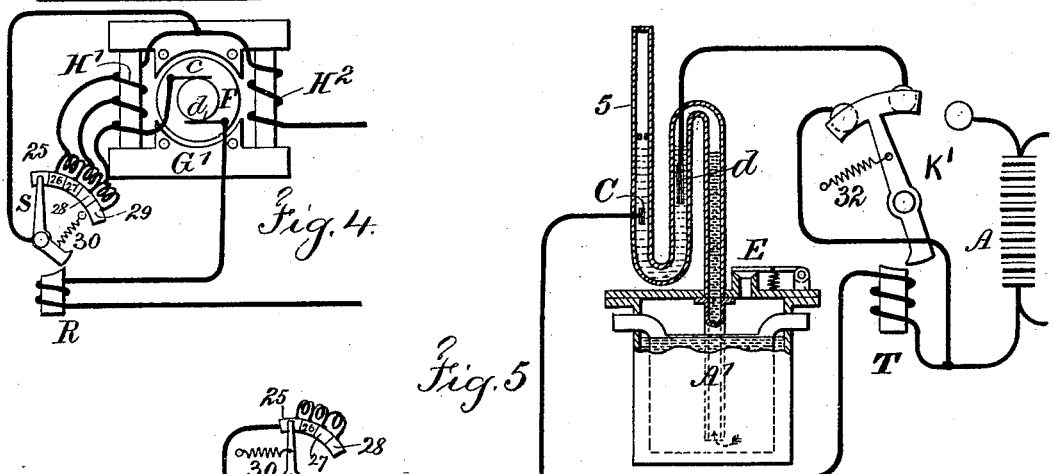
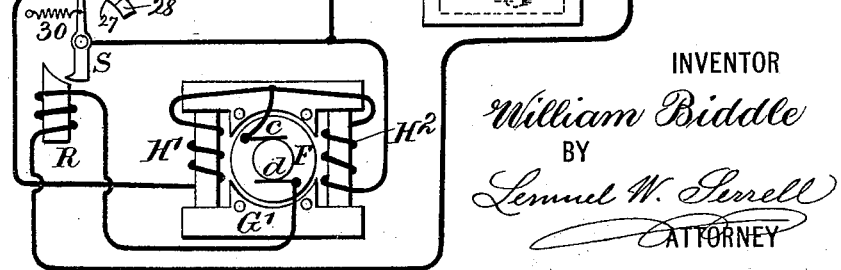
WITNESSES:
Frank S. Ober
Chas. H. Smith
INVENTOR
William Biddle
BY
Lemuel W. Serrell
ATTORNEY
ANDREW B. GRAHAM. PHOTO-LITHO. WASHINGTON, D.C.

UNITED STATES PATENT OFFICE.

WILLIAM BIDDLE, OF BROOKLYN, NEW YORK.

ELECTRIC CAR-LIGHTING APPARATUS.

SPECIFICATION forming part of Letters Patent No. 550,242, dated November 26, 1895.

Application filed March 7, 1895. Serial No. 540,816. (No model.)

*To all whom it may concern:*

Be it known that I, WILLIAM BIDDLE, a citizen of the United States, residing at Brooklyn, in the county of Kings and State of New York, have invented an Improvement in Electric Car-lighting Apparatus, of which the following is a specification.

This invention is made for regulating the output of current from the dynamo in proportion to the speed of rotation of such armature as the same is driven by a connection to the car-axle and the current is passed to a secondary battery through a three-point electromagnetic switch, which directs the current according to the polarity, so that it passes correctly to the secondary battery, and I place in the main-line circuit a regulator acted upon by the pressure generated in one or more cells of the secondary battery, so as to bring in by such regulator a resistance in the main-line circuit, or to break that circuit when the secondary battery is saturated, and the dynamo is wound with helices and a rheostat is introduced in the circuit to one of the brushes, and this rheostat is fitted with a lever moved by the armature of an electromagnet in the main circuit in such a manner that as the output of current from the armature increases more or less of the field-helices are short-circuited, so as to cut down the magnetism of the field-magnets and lessen the output of current from the armature to equalize such output under the varying speeds of rotation.

Figure 1:
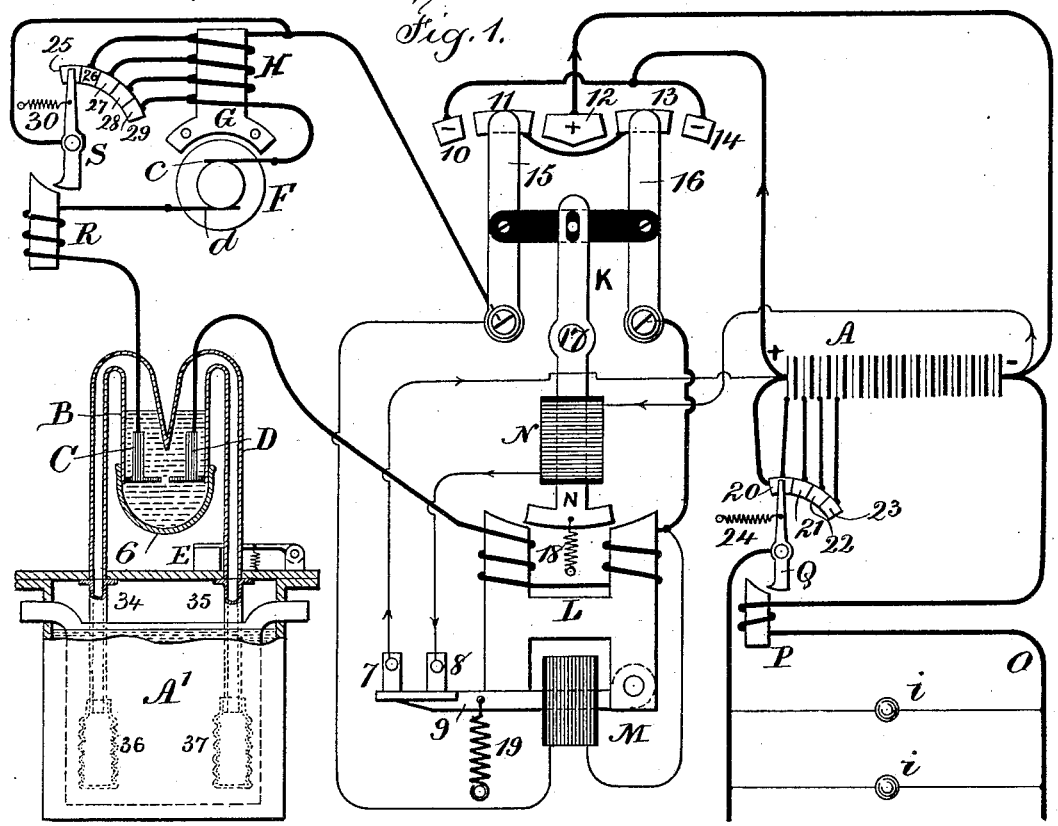
Figure 2:
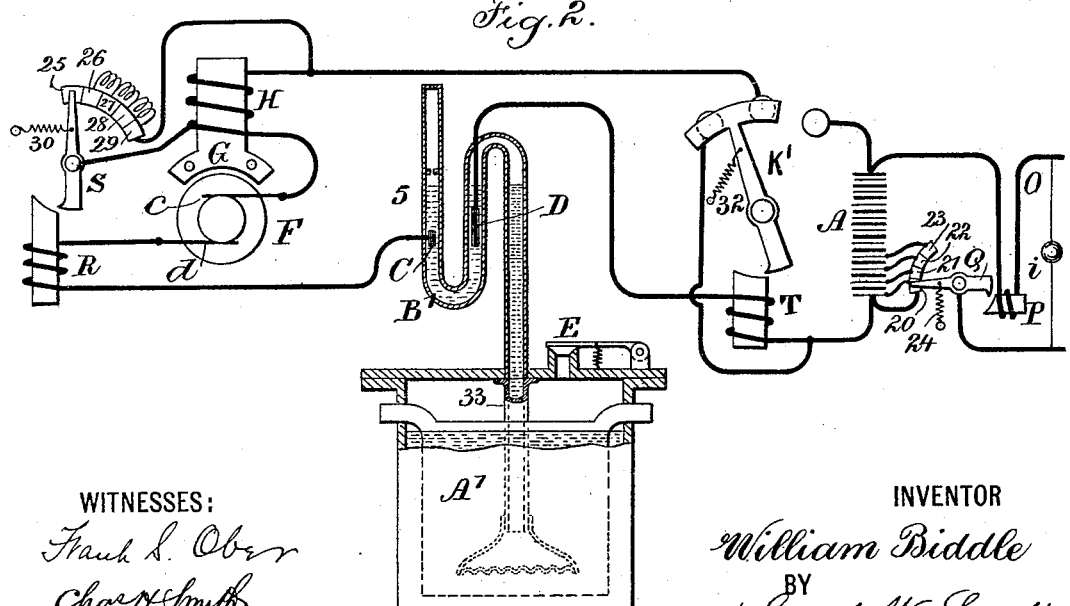

In the drawings, Figure 1 is a diagrammatic representation of the circuits in which the dynamo is provided with one field-magnet. Fig. 2 illustrates a similar field-magnet, with resistances taking the place of short circuits to the field-helices and with a modification in the three-point switch. Fig. 3 is a diagram similar to Fig. 1, with the exception that the dynamo is represented as with two poles and two field-helices. Fig. 4 is a diagram illustrating a similar dynamo to that shown in Fig. 3 and with short circuits, as well as resistances; and Fig. 5 illustrates a modification in the arrangement of the circuit connections and of the regulator connected with the secondary battery.

The secondary battery is represented at A, and a cell of said secondary battery is illustrated in Fig. 1 at A', and the top of this cell is made gas-tight, and either the gas or the liquid in the confined cell is operative upon the surface of a liquid held in the vessel B, which liquid may be acidulated water or mercury, and in it there are electrodes C and D, which are advantageously made of carbon, and to these electrodes the circuit-wires are connected, and these parts are arranged in such a manner that when the electrodes C and D are immersed in the liquid there is but little resistance to the current passing over the line through such electrodes and liquid; but when the liquid is displaced by the action of the gases and pressure generated in the cell of the secondary battery the liquid is forced away from such electrodes and more or less of the carbon is necessarily included in the circuit, so that the carbon becomes a resistance, and the more the liquid is displaced and the carbon electrode or electrodes exposed the greater will be the resistance to the current passing through the line; and it is now to be understood that the parts are so constructed and proportioned that when the secondary battery is saturated, or nearly so, the resistance of the electrodes to the passage of the current will be sufficient to substantially stop the development of current by checking the flow of such current through the main line, which includes the helix or helices of the field-magnets in the dynamo, so that the output of current from the dynamo is checked or substantially stopped; and when the gases in the cell of the secondary battery are reabsorbed as the electric current is developed by the secondary battery the liquid returns to its normal position and permits the passage of the proper current over the main line and through the liquid intervening between the electrodes, whereby the dynamo is regulated in its action in proportion to the pressure developed in a closed cell of the secondary battery; and I remark that in Figs. 2 and 5 regulators B' are represented substantially alike, such regulators being in the form of a double bent tube containing the conducting liquid, and in Figs. 1 and 3 the regulator B is represented as a vessel containing the conducting liquid and the electrodes. The pipes through which the pressure in the electrolytic cell reaches such vessel are connected to the top thereof, so that in all instances the pressure acts downwardly upon the liquid in the vessel to displace the same and uncover the carbon electrodes to a greater or less extent.

In Fig. 3 the conducting liquid, as it is displaced, rises into the tube 4 through a small aperture, so that the movement is gradual, and the same thing takes place in the tube 5, Figs. 2 and 5; but in Fig. 1 the bottom of the vessel is made elastic with a half-bulb or diaphragm 6, which, expanding under the increase of pressure, allows the liquid in the vessel B to decend and uncover the electrodes.

It is advantageous to provide a safety-valve at E to prevent injury to the parts by undue pressure.

The armature F is represented as provided with the brushes $c$ and $d$, and in Figs. 1 and 2 the field-magnet G is represented as having a helix H around it, and in Figs. 3, 4, and 5 the field-magnets G' are represented as with two poles and helices H' and H². The three-point switch K, Figs. 1 and 3, is actuated by an electromagnet L, and the switch is polarized by a helix N in a shunt of the secondary battery A passing through the contacts 7 and 8, that are closed by the armature-lever 9 of the electromagnet L, and this armature-lever 9 is polarized by a helix M in a closed shunt of the main circuit, and there are contacts 10 11 12 13 14 for the three-point switch, the contacts 11 and 13 being connected, and the insulated bars 15 16 of the three-point switch are sufficiently wide to pass from one contact to the other without breaking the circuit, and it will be observed that the helices of the electromagnet L are in the main-line circuit, and hence the polarity of the electromagnet L will depend upon the direction of revolution of the armature; but the helix N being in a shunt of the secondary battery A is not altered in polarity, and hence the three-point switch K is constantly polarized in one direction and will swing either one way or the other upon the pivot 17 according to the direction of current and polarity in the electromagnet L, and in so doing the current will reach the secondary battery in the same direction according to the position of the bars 15 and 16—that is to say, when the bar 15 rests upon 10 the current will go by 15 10 to the + end of the battery A and by 16 and 12 to the − end of the battery, and when the bars 15 and 16 are moved in the other direction the current will go by 15 and 12 to the − pole of the battery A and from 14 and 16 at the + end of such battery—and when the potential in the main circuit from the armature is the same, or nearly so, as that from the secondary battery the magnet L will be demagnetized and the kick-back will bring the parts of the three-point switch into the position shown in Figs. 1 and 3, the spring 18 accelerating the movement and steadying the parts, and at this time the helix M will cease to polarize the armature-lever 9 and the spring 19 will break contact between 7 and 8, so as to prevent any loss of energy from the secondary battery.

It is to be understood that the cell A' might be any electrolytic cell separate from the secondary battery A, but it is advantageous to make such cell as a part of the secondary battery; but to prevent complication in the lead of the wires such cell is illustrated as separate from the secondary battery.

The lamp-circuit O is represented as containing incandescent lamps at $i$ in multiple arc, and the helix P is in one wire of the lamp-circuit and its core acts upon the lever Q, the pivot of which is connected to the other wire of the lamp-circuit, and there are plates at 20 21 22 23 with connections to separate cells of the secondary battery for the purpose of throwing out of action one or more of the cells of the secondary battery to render as nearly uniform as possible the current from the secondary battery in the lamp-circuit, because if the current in the lamp-circuit is too strong the electromagnet P, acting upon the lever Q, swings the same and short-circuits one or more of the cells of the secondary battery, and the spring 24 restores the parts as the current in the lamp-circuit lessens, and at the same time it will be observed that the resistance of the secondary battery is not changed, because the entire battery remains in the main circuit to the dynamo.

In Fig. 1 the helix R is in the main circuit from one of the brushes and the helix H of the dynamo-field is in the main circuit from the other brush, and the magnetism set up in R is made to act upon the switch-lever S, the center of which is connected to the main line beyond the helix H, and there are plates 25 26 27 28 29 with branch wires to the field-helix at different places along its length. The consequence of this arrangement is that more or less of the coils in the helix H are short-circuited through one of the plates and the lever S to the main-line circuit, so that the current divides and part of it goes to the main-line circuit through the lever S and part of it through the coils of the helix H; but when said lever S is in the position shown in Fig. 1 and the spring 30 has moved such lever to the plate 25 all of the current from the brush $c$ passes through the helix H, and when the potential of the current in the main-line circuit has been sufficient to act through the helix R and move the lever S until it comes in contact with the plate 29 most of the current passes by said plate 29 to the lever S and short-circuits to that extent the helix H, cutting down the magnetism and the consequent output of current from the armature, so that by this means the dynamo is caused to develop the desired current under different speeds of rotation of armature, because as the current on the main line increases the magnetism in the field-magnet is correspondingly cut down.

In Fig. 2 the same parts are shown; but in place of connecting the plates 26, 27, 28, and 29 to the field-helix at different places along its length resistances are introduced between such plates, and these resistances become less as the switch-lever S is moved along farther, and according to the relative resistances that are connected with the plates and the resistance of the field-helix, so the current will divide, and the proportion of current passing through the field-helix H will be lessened as the voltage on the main line increases by the increased speed of rotation of the armature, and in this manner the output of current from the dynamo under the different speeds will be rendered approximately uniform.

In Figs. 3, 4, and 5 the same character of regulation is applied to a dynamo having two helices in series. In Fig. 3 the switch-lever S is in a branch circuit of the main line, and the insulated plates 25, 26, 27, and 28 are connected by rheostat-coils, which are short-circuited by the movement of the lever S under the action of the magnetism set up by the helix R, and in the position shown in Fig. 3 but little current passes by the branch containing such resistances, and as the lever S is moved the current will be diverted from the helix H' to a greater or less extent, and to that extent the magnetism in the dynamo will be cut down.

In Fig. 4 the same resistances are shown as connected with the respective plates; but there are branch wires through the resistances to the helix H' at different places along its length, so that portions of the helix H' will be short-circuited, as in Fig. 1, and the resistance will also be availed of in regulating the proportion of current passing through the helix H', so as to cut down the magnetism of the field-magnets to unify the current upon the main-line circuit under different speeds of armature.

In Fig. 5 the helix H' is in a branch of the main line, and the lever S as it moves over the plates throws into the branch circuit containing the helix H' more resistance as the voltage increases in the main line or the reverse, and thereby the magnetism set up in the field-magnets is varied according to the voltage in the main-line circuit.

The devices represented in Figs. 2 and 5 illustrate the present improvements, especially in connection with a dynamo in which the armature is revolved in one direction only, and in this case the three-point circuit-preserving switch K' does not require to be polarized nor the connections made for unifying the direction of current in passing to the secondary battery, and this circuit-preserving switch K' by its spring 32 breaks the circuit from the dynamo to the secondary battery when the potential on the line is equal, or nearly so, to that of the battery, and in breaking the circuit to the secondary battery closes the branch circuit of the main line containing the helix T, so that as soon as the potential on the main line acting in the helix T is sufficient to move the circuit-preserving switch K' against the action of the spring 32 such switch K' closes the main circuit to the secondary battery and then breaks the branch circuit, so that the current passes entirely through the secondary battery, and in consequence of the switches K K' being three-point and circuit-preserving switches there is no flash or spark, and the branch or main-line circuit is closed before the other circuit is broken.

The regulator heretofore described that is operated by the accumulation of pressure in an electrolytic cell, such as one of the cells of the secondary battery, operates without the production of any spark, because the carbon electrode becomes a gradually-increasing resistance as the conducting liquid is displaced more or less from around such carbon electrode, and when the conducting liquid is at its normal level the circuit is closed directly between the metallic wires through the conducting liquid, and hence there is but little resistance by the regulator in the circuit.

It is important to prevent any spark, especially in instances where the gases generated in the electrolytic cell pass to the electrodes, because the gases generated in such electrolytic cell are usually explosive, and in Figs. 1 and 2 I have represented connections passing down to the lower part of the electrolytic cell, so that the gases cannot pass into the tube leading to the regulator.

In Fig. 2 the pipe 33 is represented as passing to near the bottom of the electrolytic cell, so that either air or a liquid, such as paraffin-oil, may intervene in such tube 33 between the liquid of the cell and the conducting liquid in the regulator B', and in Fig. 1 the tubes 34 and 35 are represented as extending down to the lower portion of the electrolytic cell A' and provided with elastic bags or diaphragms 36 37, against which the liquid in the electrolytic cell acts to vary the pressure within the regulator-vessel B, and in this vessel B and the pipes leading to the same there may be either a liquid, such as paraffin-oil, or the atmosphere may intervene, so as to displace the conducting liquid from around the electrodes C and D in proportion to the pressure in the electrolytic cell A', and I remark that in all instances where the tube leading to the regulator passes down to the lower portion of the electrolytic cell the increase in the weight of the liquid in such cell, as the battery becomes saturated, is availed of to act in the same direction as the gaseous pressure in forcing the conducting liquid away from the electrodes to uncover the carbon terminals in proportion to the pressure in such electrolytic cell, and thereby regulate the current passing along the main line and through the secondary battery in proportion to the saturation of such secondary battery.

I claim as my invention—

1. The combination in a car lighting apparatus with the dynamo having an armature to be driven by a connection to the car axle and field helices in series with the armature, of a secondary battery, circuit connections, a three-point circuit-preserving switch to connect or disconnect the secondary battery, an electro-magnet in the main line to actuate such switch; an electro-magnet in the main line, a switch lever moved by the same, and circuit connections for varying the current passing through the field helices according to the speed of the armature and the current in the main line, substantially as specified.

2. The combination in a car lighting apparatus with the dynamo having an armature to be driven by a connection to the car axle, and field helices in series with the armature, of a secondary battery, circuit connections, a three-point circuit-preserving switch to connect or disconnect the secondary battery, an electro-magnet in the main line to actuate such switch, an electro-magnet in the main line and a switch lever moved by the same, and circuit connections and a resistance for varying the current passing through the field helices according to the speed of armature and the current in the main line, substantially as specified.

3. The combination in a car lighting apparatus with a dynamo having an armature to be driven by a connection to the car axle, and field helices in series with the armature, of a secondary battery, circuit connections and a three-point circuit-preserving switch to connect or disconnect the secondary battery, an electro-magnet in the main line to actuate such switch, and an electro-magnet in the main line and a switch lever moved by the same, and circuit connections for short circuiting more or less of the field helices according to the speed of rotation of the armature and the current in the main line, substantially as specified.

4. The combination in a car lighting apparatus with a dynamo having an armature to be driven by a connection to the car axle, and field helices in series with the armature, of a secondary battery, circuit connections and a three-point circuit-preserving switch to connect or disconnect the secondary battery, an electro-magnet in the main line to actuate such switch; and an electro-magnet in the main line and a switch lever moved by the same, and circuit connections and a resistance for short circuiting more or less of the field helices and varying the current passing through such field helices according to the speed of the armature and the current in the main line, substantially as specified.

5. The combination in an electric car lighting apparatus, of a dynamo and a secondary battery, a three point-switch between the secondary battery and the dynamo, an electro-magnet with its helix in the main circuit for moving the three-point switch to direct the current to the secondary battery or to break the main circuit to the secondary battery when the potential from the dynamo does not exceed that from the secondary battery, a helix in the shunt circuit from the secondary battery for polarizing the three-point switch, a lever and contacts for opening or closing the shunt circuit, and a helix in a closed shunt of the main circuit for polarizing the circuit closing lever, substantially as set forth.

6. The combination in a car lighting apparatus with the dynamo having an armature to be driven by a connection to the car axle and field helices in series with the armature, of a secondary battery, circuit connections and a three-point circuit-preserving and pole-changing and cut-out switch, to connect or disconnect the secondary battery and direct the current thereto, and an electro-magnet in the main line to actuate such switch, substantially as specified.

7. The combination in a car lighting apparatus, of a secondary battery, a dynamo having its field helices in series with the armature, such armature to be driven in either direction from the car axle, circuit connections between the secondary battery and the dynamo, a three-point circuit preserving switch for making and breaking the main line circuit to the dynamo, and an electro-magnet the helix of which is in the main line circuit for actuating such switch to close the circuit to the secondary battery, and a spring acting to break the circuit to the dynamo when the potential of the dynamo is less than that of the secondary battery, substantially as set forth.

8. The combination in a car lighting apparatus, of a dynamo, a secondary battery and circuit connections between the dynamo and the secondary battery, a vessel containing a conducting liquid, electrodes in the main line circuit immersed in such liquid, and a connection from such vessel to an electrolytic cell having a closed cover whereby the pressure in the closed electrolytic cell is made to displace the conducting liquid and vary the resistance in the main line circuit, substantially as set forth.

9. The combination in a car lighting apparatus, of a dynamo, a secondary battery and circuit connections between the dynamo and the secondary battery, a vessel containing a conducting liquid, carbon electrodes in the main line circuit immersed in such liquid, and a connection from such vessel to an electrolytic cell having a closed cover whereby the pressure in the closed electrolytic cell is made to displace the conducting liquid and vary the resistance in the main line circuit, substantially as set forth.

10. The combination with the dynamo and the secondary battery in an electric car lighting apparatus, of a regulator having electrodes in a conducting liquid, and a connection from the regulator to the electrolytic cell for varying the current from the main line in proportion to the saturation of the secondary battery, substantially as set forth.

Signed by me this 5th day of March, 1895.

WILLIAM BIDDLE.

Witnesses:
GEO. T. PINCKNEY,
WILLIAM G. MOTT.